(12) United States Patent
Lin et al.

(10) Patent No.: US 8,763,905 B2
(45) Date of Patent: Jul. 1, 2014

(54) DATA PROCESSING SYSTEMS APPLYING OPTICAL IDENTIFICATION DEVICES AND RELATED DATA PROCESSING AND OPERATION METHODS AND COMPUTER PROGRAM PRODUCTS THEREOF

(75) Inventors: Wei-Shen Lin, Taipei (TW); Chia-Ching Lu, Changhua (TW); Tsun Ku, Taipei (TW); Wen-Tai Hsieh, Taipei (TW)

(73) Assignee: Institute for Information Industry, Taipei (TW)

( * ) Notice: Subject to any disclaimer, the term of this patent is extended or adjusted under 35 U.S.C. 154(b) by 632 days.

(21) Appl. No.: 13/166,276

(22) Filed: Jun. 22, 2011

(65) Prior Publication Data

US 2012/0077156 A1    Mar. 29, 2012

(30) Foreign Application Priority Data

Sep. 27, 2010   (TW) ................................ 99132545 A (51) Int. Cl.
*G06K 7/10*  (2006.01)
*G06K 7/14*  (2006.01)

(52) U.S. Cl.
USPC . 235/454; 235/375; 235/462.49; 235/472.01; 235/472.02; 235/472.03; 434/317

(58) Field of Classification Search
USPC ................ 235/375, 454, 462.45, 462.49, 235/472.01–472.03; 434/308, 317
See application file for complete search history.

(56) References Cited

U.S. PATENT DOCUMENTS

| | | | | |
|---|---|---|---|---|
| 4,964,167 A * | 10/1990 | Kunizawa et al. | ............ | 704/260 |
| 5,644,557 A * | 7/1997 | Akamine et al. | ................ | 369/14 |
| 6,529,920 B1 * | 3/2003 | Arons et al. | ................... | 715/268 |
| 7,203,455 B2 * | 4/2007 | Ernst et al. | ..................... | 434/317 |
| 7,299,971 B2 * | 11/2007 | Marggraff et al. | ............ | 235/375 |
| 7,922,099 B1 * | 4/2011 | Schmidt et al. | ................ | 235/494 |
| 8,261,967 B1 * | 9/2012 | Long et al. | ..................... | 235/375 |
| 2003/0117379 A1 * | 6/2003 | Carro | ............................. | 345/173 |
| 2004/0229195 A1 * | 11/2004 | Marggraff et al. | ............ | 434/169 |
| 2005/0082360 A1 * | 4/2005 | Shu | ................................ | 235/375 |
| 2006/0033725 A1 * | 2/2006 | Marggraff et al. | ............ | 345/179 |
| 2009/0128520 A1 * | 5/2009 | Combe | .......................... | 345/179 |

FOREIGN PATENT DOCUMENTS

| | | |
|---|---|---|
| CN | 101388235 A | 3/2009 |
| JP | 2006-011855 A | 1/2006 |
| JP | 2006-039868 A | 2/2006 |
| JP | 2009-217678 A | 9/2009 |
| TW | 412694 B | 11/2000 |
| TW | 200634601 A | 10/2006 |
| WO | WO 2004/029871 A1 | 4/2004 |

* cited by examiner

*Primary Examiner* — Tuyen K Vo
(74) *Attorney, Agent, or Firm* — Birch, Stewart, Kolasch & Birch, LLP (57) ABSTRACT

A data processing system applying optical identification devices includes a printed matter having a plurality of encoded data printed thereon; an optical identification device for reading at least one encoded data from the printed matter; and a data processing device coupled to the optical identification device and storing a plurality of content data for reading the at least one encoded data through the optical identification device, obtaining at least one first data corresponding to an operation and one second data corresponding to one of the content data from the read encoded data and performing the corresponding operation of the first data on the one of the content data that the second data corresponds to.

21 Claims, 5 Drawing Sheets

| 0 0 1 | 0 1 0 1 0 1 1 1 0 1 0 0 0 |

| 0 0 0 | Index operation |
| 0 0 1 | Play operation |
| 0 1 0 | Functional instruction operation |
| 0 1 1 | Adaptive automatic generation of exercises operation |

DATA PROCESSING SYSTEMS APPLYING OPTICAL IDENTIFICATION DEVICES AND RELATED DATA PROCESSING AND OPERATION METHODS AND COMPUTER PROGRAM PRODUCTS THEREOF

CROSS REFERENCE TO RELATED APPLICATIONS

This Application claims priority of Taiwan Application No. 099132545, filed on Sep. 27, 2010, the entirety of which is incorporated by reference herein.

BACKGROUND OF THE INVENTION

1. Field of the Invention

The invention relates to data processing systems applying optical identification devices and data processing and operation methods thereof, and more particularly to data processing systems and data processing methods thereof capable of processing data by applying optical identification devices to read at least one encoded data on a printed matter.

2. Description of the Related Art

With the change in learning mode, currently, human-computer interaction devices (such as data processing systems with an optical identification device and the learning device) have been widely used for learning. Users may learn by using the optical identification device, such as optical pen/smart pen/voice pen/speaking pen, and learning device. The optical identification device can be clicked on a picture or text in a printed matter (such as a book) for reading the encoded data on the clicked picture or text. The optical identification device or learning device may then execute the pronunciation of a specific word, picture, video and other multimedia content based on the encoded data. However, such application can only read the encoded data to directly execute the corresponding multimedia content (such as sound, picture, audio and video). More complex operation behaviors, e.g. pause, replay or page forward operation cannot be proceed, nor can the interaction among multiple users. Thus, it cannot meet the diverse learning needs.

In addition, for the convenience of usage, the read area of currently available optical pen/smart pen/voice pen/speaking pen and other products is limited. For reading a complete code in one click, the encoded data on the printed matter should not be too long so as to exceed the read area scope of the optical pen/voice pen/speaking pen and other product. Therefore, there is a limit in encoding bits, and only a single index table is available. The amount of encoding data is also limited, and it is not enough for the huge amount of multimedia content. Although enhancing the hardware function and increasing the amount of the hardware could store more the amount of the encoding data, it will also increase cost. Furthermore, a pen and a book are typically sold in a pair due to the encoding space is limited. Therefore, each optical pen/voice pen/speaking pen does not match with another book in different pairs such that the cost is high.

BRIEF SUMMARY OF THE INVENTION

It is therefore an objective to provide data processing system applying optical identification devices and data processing and operation methods thereof.

An embodiment of the invention provides a data processing system applying optical identification devices comprises a printed matter, an optical identification device and a data processing device. A plurality of encoded data are printed on the printed matter. The optical identification device reads at least one encoded data from the encoded data on the printed matter. The data processing device is coupled to the optical identification device and stores a plurality of content data for receiving the at least one encoded data read by the optical identification device, obtaining at least one first data corresponding to an operation and one second data corresponding to one of the content data from the read encoded data, and performing the operation that the first data corresponds to on the one of the content data that the second data corresponds to.

In another embodiment, a data processing method for applying by a data processing system is provided, wherein the data processing system comprises at least a printed matter with a plurality of encoded data printed thereon, an optical identification device and a data processing device storing a plurality of content data. The method comprises the following steps. First, at least one encoded data printed on the printed matter is read by the data processing device through the optical identification device. At least one first data corresponding to an operation and one second data corresponding to one of the content data are then obtained from the read encoded data by the data processing device. The operation that the first data corresponds to is performed on the one of the content data that the second data corresponds to by the data processing device.

In yet another embodiment, an operation method for applying by a data processing system is provided, wherein the data processing system comprises at least a printed matter, an optical identification device and a data processing device storing a plurality of content data, and a plurality of encoded data corresponding to the content data have printed on the printed matter. The method comprises the steps of providing a printed remote controller which is printed on the printed matter by a pattern form and the printed remote controller includes a plurality of functional keys, each of which including a corresponding encoded data printed thereon; reading at least one encoded data printed on the printed matter and an encoded data of a content data corresponding thereto within the printed matter through the optical identification device; and obtaining, through the data processing device, at least one first data corresponding to an operation and one second data corresponding to one of the content data from the read encoded data and performing the operation that the first data corresponds to on the one of the content data that the second data corresponds to.

Data processing methods and systems may take the form of a program code embodied in a tangible media. When the program code is loaded into and executed by a machine, the machine becomes an apparatus for practicing the disclosed method.

A detailed description is given in the following embodiments with reference to the accompanying drawings.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken during a limiting sense. The scope of the invention is best determined by reference to the appended claims.

The invention is now described with reference to FIGS. 1 through 5, which generally relate to data processing systems applying optical identification devices and related data processing and operation methods. In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. It should be understood that many of the elements described and illustrated throughout the specification are functional in nature and may be embodied in one or more physical entities or may take other forms beyond those described or depicted.

Figure 1:
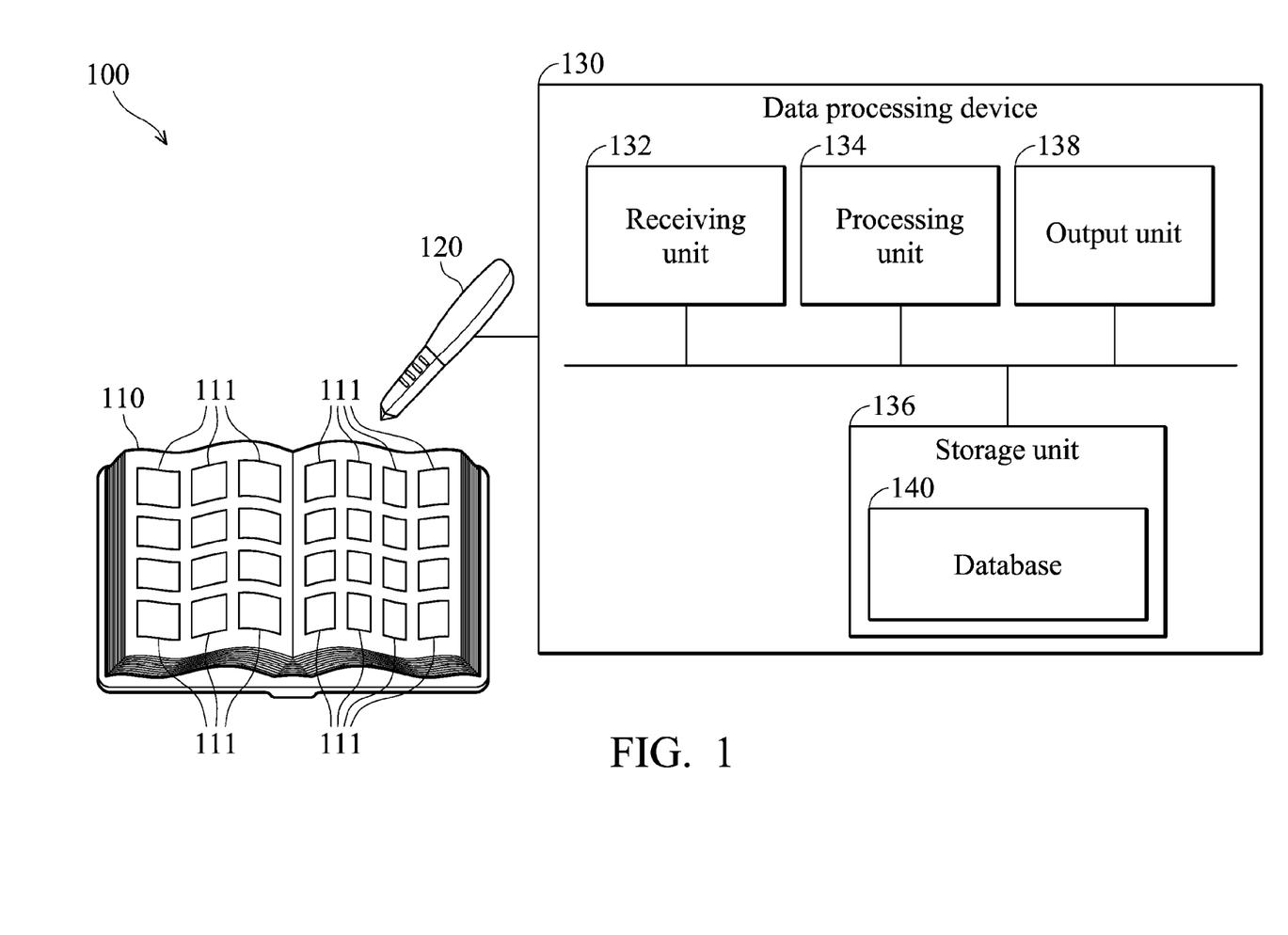
FIG. 1 is a schematic diagram illustrating an embodiment of a data processing system applying optical identification devices of the invention.

FIG. 1 is a schematic diagram illustrating an embodiment of a data processing system 100 applying optical identification devices of the invention. The data processing system 100 at least comprises a printed matter 110, an optical identification device 120, and a data processing device 130. The printed matter 110 may be any material or articles that encoded data can be printed thereon, such as paper, plastic, or all kinds of merchandise and their packaging. Particularly, the printed matter 110 may be a piece of paper or a book. On the printed matter 110, several bitmap pictures may be printed to represent the corresponding encoded data 111 which is encoded based on a specific encoding format described below. The bitmap picture can be composed of graphics, bar codes, texts, numbers, symbols, and/or a plurality of points. The data processing device 130 stores a plurality of content data, such as audio and video data files, Web data, multimedia documents and so on.

Figure 2A:
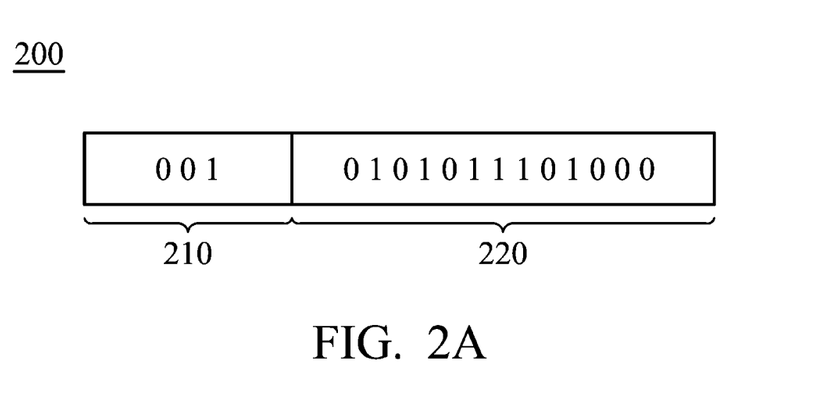
FIG. 2A is a schematic diagram illustrating an embodiment of an encode data of the invention.
Figure 2B:
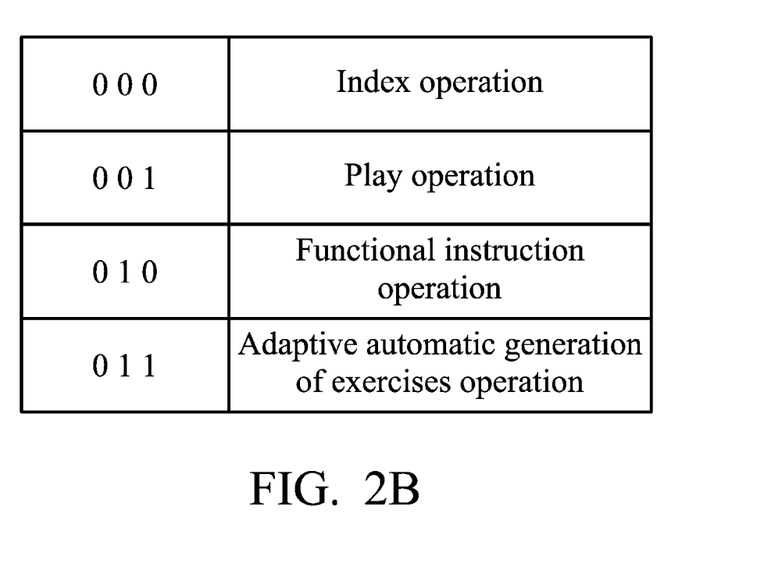
FIG. 2B is a schematic diagram illustrating an embodiment of an operation indicating lookup table of the invention.

FIG. 2A is a schematic diagram illustrating an embodiment of an encode data 200 of the invention. It is to be noted that, in this embodiment, the encoded data 200 has been divided into two code segments 210 and 220 for illustration, but the invention is not limited thereto. In other words, in some embodiments, the encoded data may only have one section or be divided into two or more sections based on actual requirement. For example, in another embodiment, the encoded data can be divided into three sections, wherein data of each section represents a specific meaning or is used for a specific purpose.

In this embodiment, the encoded data 111 has divided the 16-bit code into two sections: bits 1 to 3 as the first code segment with first data, and bits 4 to 16 bit as the second code segment with second data. Note that the number of bits of the two divided sections may also be adjusted according to actual requirement. It is not limited to the aforementioned example. For example, in some embodiments, bits 1 to 4 may be the first code segment, and bits 5 to 16 may be the second coding section. For example, as shown in FIG. 2A, the code segment 210 contains a first data "001" which may correspond to an operation, such as an index operation, execute operation, functional instruction or adaptive automatic generation of exercises operation, but the invention is not limited thereto. The code segment 220 contains a second data "0101011101000", which can be the parameter value of operational instructions represented in corresponding to the first code segment, such as one of a plurality of content data stored in the data processing device 130, for example. In other embodiments, it also can be designed as the first code segment containing the second data, while the second code segment containing the first data.

The data processing device 130 may be coupled to the optical identification device 120 by way of wireless or wired link. Namely, the optical identification device 120 may read one of the encoded data 200 and provides it to the data processing device 130, such that the data processing device 130 may obtain first data and second data from the encoded data and then perform the operation that the first data corresponds to on the content data that the second data corresponds to.

In some embodiments, the data processing device 130 may further include a storage unit 136 storing a plurality of index tables that correspond to the printed matters and index table codes corresponding thereto. Each index table has the corresponding index table code that respectively corresponds to different printed matter, wherein each index table records the content data codes corresponding to a plurality of content data for the corresponding printed matter. For example, the first data obtained through the reading by the optical identification device 120 may represent the corresponding index table code, and the second data may represent the corresponding content data code. In other words, the first data is one of the index table codes, and the second data is one of the content data codes. Therefore, the data processing device 130 may select the corresponding index table from the index tables stored in the storage unit 136 based on the first data it had read (the index table code) and obtain the content data that the second data corresponds to (content data code) from the selected corresponding index table.

In some embodiments, an operation index table may further be established. Please refer to FIG. 2B. When the first data is 000, the operation which is predetermined as an index operation will retrieve the index table of index number 000, and the second data corresponds to the content data code within the index table 000. So the data processing device 130 may read the content data with number of 0000000000001 from the index table 000 based on the encoded data "0000000000000001". When the first data is 001, the operation which is predetermined as a play operation, and the second data may represent the content data which will be executed, e.g. a file number or a file name of a multimedia file. Therefore, the data processing device 130 may play/execute the multimedia file encoded with "0000000000001" based on the encoded data "0010000000000001". The aforementioned operation index table may also contain a plurality of functional instructions and corresponding functional instruction codes thereof. For example, when the first data is 010, it may represent that the operation to perform is one functional instruction of the functional instructions, such as a page forward operation, while the second data may represent content data code which will be performed. Therefore, the data processing device 130 may perform a page forward operation on the content data with code "0000000000001" based on the encoded data "0100000000000001". Another example is when the first data is 011, which may represent that the operation to be performed is an adaptive automatic generation of exercises operation, while the second data may represent the content data for generating exercises/questions, such as a text. In this case, the data processing device 130 may automatically generate exercises/examination questions using that text based on the encoded data "0110000000000001".

In some embodiments, the data processing device 130 may also through the optical identification device read more than one encoded data and get the first data, the second data, and the third data. The first data may represent the operational instructions to proceed, the second data may represent the corresponding content data code, and the third data may represent the corresponding index table code. Therefore, the data processing device 130 may perform specific operations on the specified content data in a designated index table based on that encoded data.

By the aforementioned specific encoded data, embodiments of the invention, the amount of code index can be effectively expanded by utilizing its multi-level coding index. For example, when the length of encoded data is 16 bits, the first code segment can be set to 3 bits (i.e., the maximum can be up to $2^3=8$ different operational instructions) and the second code segment can be set to 13 bits. Therefore, if the first data in the first code segment represents the index operation, the second data can represent $2^{13}=8192$ content data. If the third data is also set to 13 bits, the third data also can represent 8192 index tables. In this embodiment, if the first data in the first code segment represents a play operation, each table (represents a book) may include up to a maximum of 8192 multimedia files and thus a single optical identification device may accommodate a total number of 67.1 million of multimedia file (8192 books×8192 tables).

In one embodiment, when the printed matter is a paper book, an editing operation may be performed on the contents and responsive digital multimedia files of each book to generate an index table for each book in advance, so each book may correspond to an index table and an index table number. Thereafter, each index table may be stored in a storage unit 136 of the data processing device 130 for subsequent use.

It is to be understood that the optical identification device 120 and the printed matter 110 do not need to be connected. When the user attempts to use the system or method, the user may utilize the optical identification device 120 to approach or to touch the printed matter 110 so as to make the optical identification device 120 being able to read one or more encoded data 111 on the printed matter 110. The optical identification device 120 may read of a bitmap picture from the printed matter 110 and convert this bitmap picture to an encoded data, subsequently transferring the encoded data to the data processing device 130 for processing. The optical identification device 120 may be further operated on a plurality of printed matters, and each printed matter has a printed matter number. Namely, the plurality of the printed matters may be read by the same optical identification device 120.

The data processing device 130 may be a portable device or a computing device, such as a mobile phone, a PDA, a GPS navigation device, a personal computer, a laptop computer or any kind of computers, for performing subsequent data analysis and display operations. The data processing device 130 may further include a receiving unit 132, a processing unit 134, a storage unit 136 and an output unit 138, wherein the receiving unit 132, the processing unit 134, the storage unit 136 and the output unit 138 may be coupled to each other through a bus. It is to be noted that the receiving unit 132 may comprise a wired receiving unit, e.g. a USB interface unit, or a receiving unit for wireless communication, e.g. BLUETOOTH, wireless LAN interface or the like, but the invention is not limited thereto.

The data processing device 130 may be further coupled to the optical identification device 120 through the receiving unit 132 by way of wireless or wired link to communicate with the optical identification device 120, and one or more encoded data (referring to the encoded data 200 as shown in FIG. 2) can be read by the optical identification device 120. In some embodiments, the wireless link may be wireless radio frequency communication, radio frequency, BLUETOOTH, Wifi, or UWB, and the wired link may be USB transmission, RS-232, or IEEE 1394.

The processing unit 134 may obtain one or more coded data and obtain at least a first data and a second data from the encoded data, in which the first data corresponds to an operation and the second data corresponds to one of the content data. Thereafter, the content data that the second data corresponds to will be performed by the operation that the first data corresponds to.

The storage unit 136 may further store all the necessary data, such as index tables that several printed matters corresponding to, and the corresponding multimedia content and files. The storage unit 136 may further include a database 140, in which the database 140 stores the index tables corresponding to the several printed matters. Each index table may correspond to one of print matters and record the content data codes corresponding to the content data of the printed matter. For example, the first data can be one of the aforementioned index table codes, and the second data can be one of the aforementioned content data code. In one embodiment, the data processing device 130 may select a corresponding index table from the index tables stored in the database 140 of the storage unit 136 based on the first data, and obtain the content data that the second data corresponds to from the selected corresponding index table.

The storage unit 136 may be any type of memory or storage media such as disk, but it is not limited thereto. The output unit 138 may be utilized to provide the content or results corresponding to this operation. For example, the output unit 138 may include a display (such as a liquid crystal display) and an audio unit (e.g., a speaker). Multimedia files or sound files corresponding to this operation can be displayed through the display or the audio unit. Note that, although the output unit 138 can be configured on the data processing device 130 in this embodiment, the invention is not limited thereto. For example, in another embodiment, the output unit 138 may communicate with the data processing device 130 by a wired or wireless connection so as not to be set on the data processing device 130.

Figure 3:
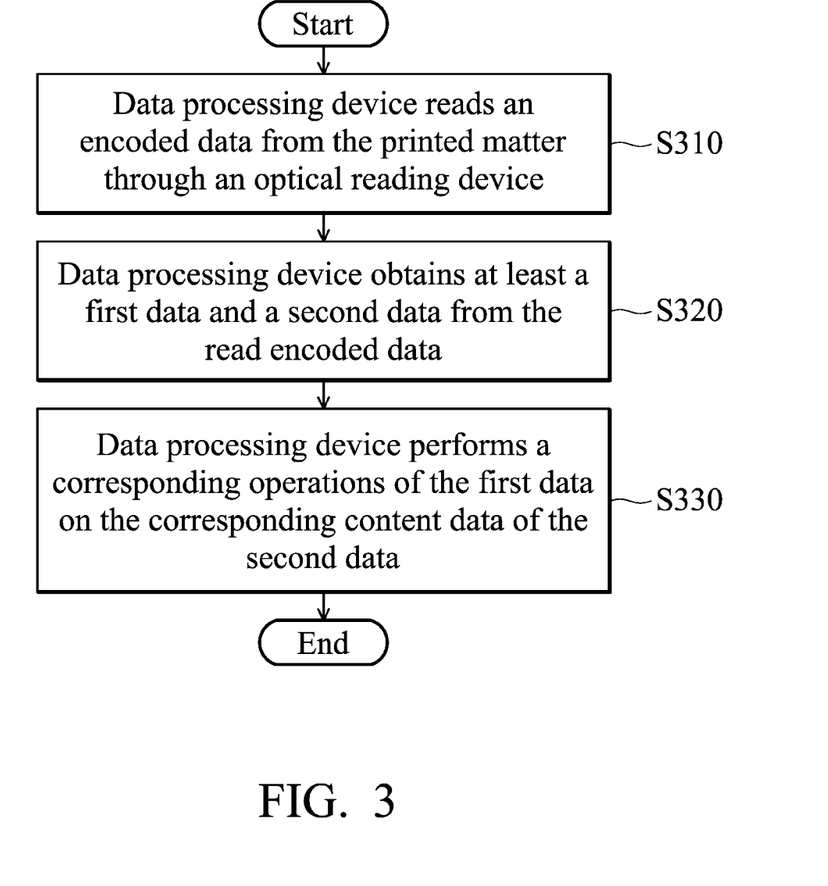
FIG. 3 is a flowchart illustrating an embodiment of a data processing method of the invention.

FIG. 3 is a flowchart illustrating an embodiment of a data processing method of the invention. The data processing method can be performed by the data processing system 100 shown in FIG. 1. First, in step S310, the data processing device 130 reads an encoded data 111 from the printed matter 110 through the optical identification device 120. Note that the encoded data 111 has a format similar to that of the encoded data 200 in FIG. 2. Then, in step S320, the data processing device 130 obtains the first data and second data from the read encoded data, of which the first data corresponds to one operation and the second data corresponds to one of the content data. In this step, based on the encoding principle in FIG. 2, the encoded data can be divided into a first code segment and a second code segment. Then, the first data may be obtained from the first code segment by the data processing device 130, while the second data may be obtained from the second code segment. For example, if the encoded data is "0010001101010101", it can be divided into two code segments, namely, "001" and "0001101010101", wherein "001" represents the first data, and "0001101010101" represents the second data. In another embodiment, the optical identification device 120 may read two encoded data at one time, of which one is the first data and the other is the second data.

After obtaining the first and second data, in step S330, the data processing device 130 may then perform the corresponding operations of the first data on the corresponding content data of the second data. As aforementioned, the first data may at least represent the operational instructions including index operation, play operation, and functional instruction, but it is not limited thereto.

As aforementioned, the data processing device 130 may determine the operation to be performed based on the first data in the first code segment. The corresponding content data obtained from the second data in the second code segment is then used on the operation.

In one embodiment, when the corresponding operation of the first data represents the "index operation", the data processing device 130 will select a first index table in the database 140 of the storage unit 136 based on the second data obtained. For example, if the encoded data is "0000000000000001", the first data will be 000 which represents the operation to be performed is to find the content data encoding in the index table 000 and the second data will be "0000000000001" which represents the corresponding content data code in the index table coded 000. Therefore, based on data "0000000000000001", the data processing device 130 can read the content data coded 0000000000001 in the index table coded 000 from the database 140 of the storage unit 136.

In some embodiments, after finding the first index table, the first index table can be used to engage in subsequent operations such as a play operation, a functional instruction, and so on.

In another embodiment, after finding the first index table, the play operation can subsequently be performed to execute or perform a specific multimedia file, which corresponds to the multimedia content of the first index table. In this embodiment, when the corresponding operation of the first data represents a "play operation", the data processing device 130 may search the multimedia file that corresponds to the second data in the given first index table using the second data in order to obtain one multimedia file and execute it. For example, when the encoded data is "0010000000000001", the corresponding first data will be "001" which represents the operation to be play a multimedia file, and the second data will be "0000000000001" which represents the multimedia file corresponding the content data code "0000000000001" will be executed. Therefore, based on the encoded data "0010000000000001", the data processing device 130 can play the multimedia file coded "0010000000000001" in the database 140.

In another embodiment, the above operational index table may further contain a plurality of functional instructions and functional instruction codes corresponding thereto. For example, when the first data is 010, it represents the functional instruction (e.g. page forward operation) that corresponds to 010 is to be executed. The second data on the other hand represents the content data code to be executed; therefore, the data processing device 130 can perform the page forward operation for the content data coded "0000000000001" based on the encoded data "0100000000000001". The functional instruction operation may be at least one of a pause operation, replay operation and page forward/backward operation, but the invention is not limited thereto.

In another specific embodiment, the functional instruction operation may correspond to the functions on a remote controller. In this case, the first data may represent the instruction index table to be executed, while the second data may represent a specific instruction in this instruction index table. For example, when the encoded data is "0100000000000001", the first data is "010" which corresponds to a instruction index table while the second data is "0000000000001" which corresponds to the corresponding instructions in the instruction index table coded (or functional coded) as 0000000000001. Therefore, the data processing device 130 can use the second data to search instructions coded (or functional coded) as 0000000000001 in the given instruction index table and execute the operations corresponding to these instructions. If one instruction with the functional code of 0000000000001 represents the page forward operation is to be executed, the data processing device 130 will execute it. For example, the content of the previous page can be displayed through the output unit 138.

In yet another embodiment, when the first data is 011, it may represent the adaptive automatic generation of exercises operation is to be executed, and the second data may represent the content data (such as a text/word) of the exercises to be generated; therefore, the data processing device 130 can determine the text/word and find a collection of spelling errors that correspond to the text/word based on the encoded data "0110000000000001". The said spelling errors may then be used to create a dynamic exercise bank to generate exercises for the adaptive automatic generation of exercises operation.

Figure 4:
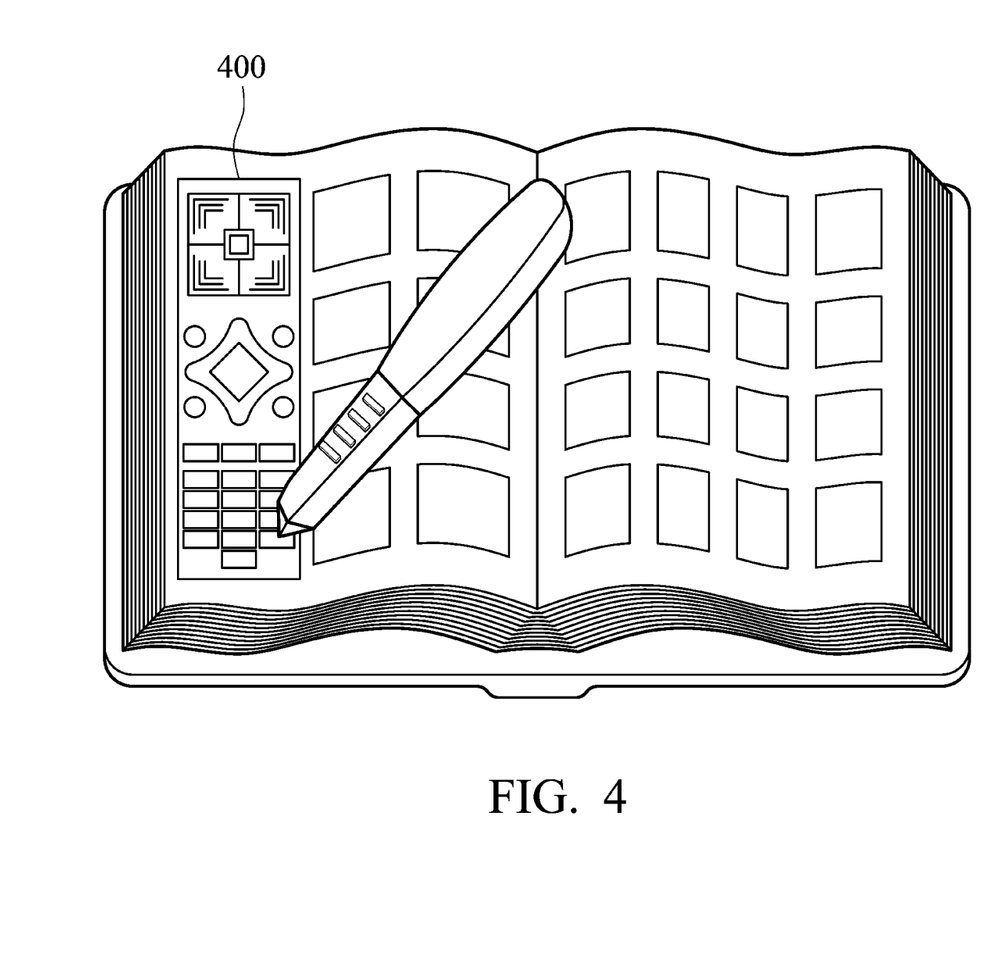
FIG. 4 is a schematic diagram illustrating an embodiment of a printed remote controller of the invention, which is printed on a printed matter.

In one embodiment, one operation method is further provided in which a graphic operation interface is printed on the printed matter 110 (such as the printed remote controller, printed keyboard, etc.). On every buttons or options of the graphic operation interface, one encoded data is printed, and each of the encoded data corresponds to one of the corresponding operation on the remote controller or keyboard. For example, the graphic operation interface may be a printed remote control 400, which may be utilized to perform the corresponding operation.

Figure 5:
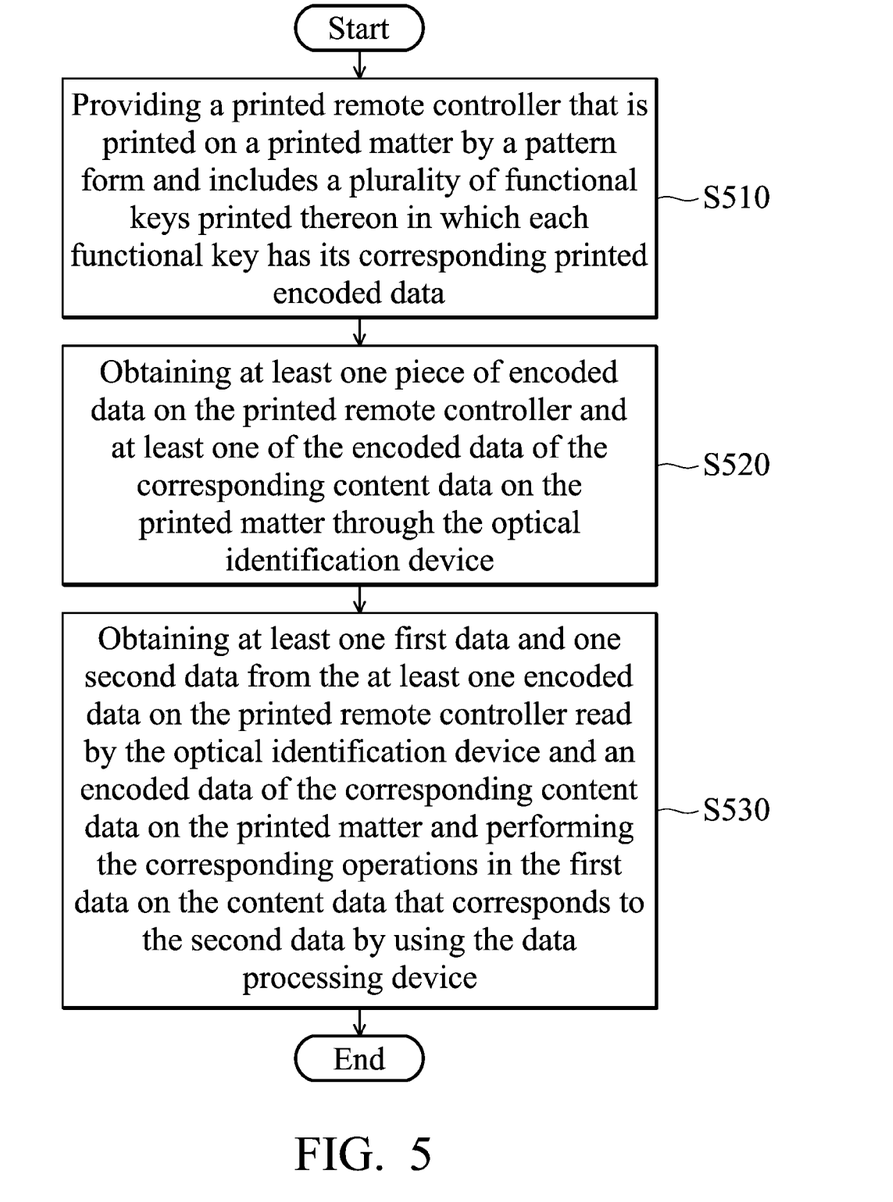
FIG. 5 is a flowchart illustrating an embodiment of an operation method of the invention.

FIG. 5 is a flowchart illustrating an embodiment of an operation method of the invention. The operation method can be performed by the data processing system 100 shown in FIG. 1, which includes at least a printed matter, an optical identification device and a data processing device that stores a plurality of content data. Among them, at least one of the printed matters contains a plurality of encoded data printed thereon that correspond to the content data. The operation method will be explained in detail as follows. First, in step S510, a printed remote controller is provided. The printed remote controller can be printed on the printed matter 110 by a pattern form. In other embodiments, the printed remote controller may also be printed on printed matters that are not part of the printed matter 110 (such as independent paper cards, plastic films, etc.), or on multiple locations within the printed matter 110 (such as every page of a book). The printed remote controller may have a plurality of functional keys printed thereon in which each functional key has its corresponding printed encoded data, as shown in 400 of FIG. 4. Secondly, in step S520, at least one piece of encoded data on the printed remote controller and at least one of the encoded data of the corresponding content data on the printed matter are obtained through the optical identification device 120. Thereafter, in step S530, at least one first data and one second data are obtained from the at least one encoded data on the printed remote controller read by the optical identification device 120 and an encoded data of the corresponding content data on the printed matter in which the first data corresponds to an operation while the second data corresponds to one of the content data, and the corresponding operations in the first data is performed on the content data that corresponds to the second data by using the data processing device 130. Note that, the aforementioned operations should at least include one of the following, namely, the play operation, pause operation, replay operation, and page forward/backward, and forward/rewind operations.

In a specific embodiment, the data processing system of the invention can be applied in classroom teaching. When teachers wish to use teaching material suppliers' multimedia teaching materials or self-compiled multimedia supplementary contents during teaching, the optical identification device (such as speaking pen) can be directly utilized to select the corresponding encoded data on the printed matter (such as the paper textbook) to perform a real time teaching. By doing so, the links between the multimedia content and paper textbook, as well as the teaching versatility, can be greatly enhanced. In addition, each student may be given a personal optical identification device to interact with the teachers and other fellow students, thus strengthening the participation in attending the class.

In summary, according to the data processing system applying the optical identification devices and data processing method thereof of the invention, an encoding extension mechanism can be established to divide encoded data into several code segments, thereby allowing the simple reading hardware to support more complex and diversified operation models and functional behaviors. Furthermore, the invention also provides a multi-level index mechanism that can effectively solve the problem of encoding extension limitations and reduce the hardware costs.

Data processing systems and methods thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention (e.g., use a ring buffer). Therefore, the scope of the present invention shall be defined and protected by the following claims and their equivalents.

What is claimed is:

1. A data processing system applying optical identification devices, comprising:
a printed matter with a plurality of encoded data printed thereon;
an optical identification device for reading at least one encoded data from the encoded data on the printed matter; and
a data processing device storing a plurality of content data for receiving the at least one encoded data read by the optical identification device, obtaining at least one first data corresponding to an operation and one second data corresponding to one of the content data from the read encoded data, and performing the operation that the first data corresponds to on the one of the content data that the second data corresponds to.

2. The data processing system as claimed in claim 1, wherein the encoded data includes first and second code segments, and the data processing device further obtains the first data from the first code segment and obtains the second data from the second code segment.

3. The data processing system as claimed in claim 1, wherein the optical identification device reads two encoded data among the plurality of encoded data, and one of the two read encoded data is the first data and the other of which is the second data.

4. The data processing system as claimed in claim 1, wherein the data processing device further comprises a storage unit that stores a plurality of index tables and corresponding index table codes thereof, each index table corresponding to a different printed matter records the content data codes that correspond to a plurality of content data on each of the printed matters respectively, the first data is one of the index table codes while the second data is one of a plurality of the content data codes, and the data processing device further selects a first index table from the index tables of the storage unit based on the first data and obtains the content data that corresponds to the second data according to the first index table.

5. The data processing system as claimed in claim 1, wherein the content data is a multimedia file, and the data processing device performs the operation that the first data corresponds to on the one of the content data that the second data corresponds to by executing the multimedia file.

6. The data processing system as claimed in claim 1, wherein the data processing device further comprises a storage unit storing an index table, the index table including a plurality of functional instructions and corresponding functional instruction codes thereof, the first data is one of the functional instruction codes, and the data processing device obtains a first functional instruction corresponding to the first data according to the index table and the first data and performs the first functional instruction on the content data that the second data corresponds to.

7. The data processing system as claimed in claim 6, wherein a graphic user interface including a plurality of buttons is printed on the printed matter, each of the buttons on the graphic user interface has a corresponding encoded data printed thereon, and the corresponding encoded data printed on each of the buttons corresponds to one of the functional instruction codes.

8. The data processing system as claimed in claim 1, wherein the first data corresponds to an adaptive automatic generation of exercises operation and the content data that the second data corresponds to is a word, and wherein the data processing device further finds a collection of spelling errors corresponding to the word and uses the found collection of spelling errors of the word to perform the adaptive automatic generation of exercises operation.

9. The data processing system as claimed in claim 1, wherein the data processing device further comprises a receiving unit to communicate with the optical identification device to receive the encoded data read by the optical identification device.

10. The data processing system as claimed in claim 1, wherein the data processing device further couples to an output unit for providing a user interface and operation result corresponding to the operation.

11. A data processing method for applying by a data processing system, wherein the data processing system comprises at least a printed matter with a plurality of encoded data printed thereon, an optical identification device and a data processing device storing a plurality of content data, comprising:
   reading, by the data processing device, at least one encoded data printed on the printed matter through the optical identification device;
   obtaining, by the data processing device, at least one first data corresponding to an operation and one second data corresponding to one of the content data from the read encoded data; and
   performing, by the data processing device, the operation that the first data corresponds to on the one of the content data that the second data corresponds to.

12. The data processing method as claimed in claim 11, wherein the encoded data further includes first and second code segment and the step of obtaining, by the data processing device, at least one first data corresponds to an operation and one second data corresponds to one of the content data further comprises:
   obtaining, by the data processing device, the first data from the first code segment and obtains the second data from the second code segment.

13. The data processing method as claimed in claim 11, wherein the optical identification device reads two encoded data among the plurality of encoded data and one of the two read encoded data is the first data and the other of which is the second data.

14. The data processing method as claimed in claim 11, wherein the data processing device further comprises a storage unit that stores a plurality of index tables and corresponding index table codes thereof, each index table corresponding to a different printed matter records the content data codes that correspond to a plurality of content data on each of the printed matters respectively, the first data is one of the index table codes while the second data is one of a plurality of the content data codes, and the step of performing, by the data processing device, the operation that the first data corresponds to on the one of the content data that the second data corresponds to the data processing device further comprises:
   selecting, by the data processing device, a first index table from the index tables of the storage unit based on the first data and obtains the content data that corresponds to the second data according to the first index table.

15. The data processing method as claimed in claim 11, wherein the content data is a multimedia file, and the operation that the first data corresponds to is performed, by the data processing device, on the one of the content data that the second data corresponds to by executing the multimedia file.

16. The data processing method as claimed in claim 11, wherein the data processing device further comprises a storage unit storing an index table, the index table including a plurality of functional instructions and corresponding functional instruction codes thereof, and wherein the first data is one of the functional instruction codes and the step of performing, by the data processing device, the operation that the first data corresponds to on the one of the content data that the second data corresponds to further comprises:
   obtaining, by the data processing device, a first functional instruction corresponding to the first data according to the index table and the first data and performs the first functional instruction on the content data corresponds to the second data.

17. The data processing method as claimed in claim 16, wherein a graphic user interface including a plurality of buttons is printed on the printed matter, each of the buttons on the graphic user interface has a corresponding encoded data printed thereon, and the corresponding encoded data printed on each of the buttons corresponds to one of the functional instruction codes.

18. The data processing method as claimed in claim 11, wherein the first data corresponds to an adaptive automatic generation of exercises operation and the content data that the second data corresponds to is a word, and wherein the data processing device further finds a collection of spelling errors of the word and uses the found collection of spelling errors corresponding to the word to perform the adaptive automatic generation of exercises operation.

19. The data processing method as claimed in claim 11, wherein the optical identification device comprises a reading-pen and the printed matter comprises a paper book.

20. An operation method for applying by a data processing system, wherein the data processing system comprises at least a printed matter, an optical identification device and a data processing device storing a plurality of content data, and a plurality of encoded data corresponding to the content data have printed on the printed matter, comprising:
   providing a printed remote controller which is printed on the printed matter by a pattern form and the printed remote controller includes a plurality of functional keys, each of which including a corresponding encoded data printed thereon;
   reading at least one encoded data printed on the printed matter and an encoded data of a content data corresponding thereto within the printed matter through the optical identification device; and
   obtaining, through the data processing device, at least one first data corresponding to an operation and one second data corresponding to one of the content data from the read encoded data and performing the operation that the first data corresponds to on the one of the content data that the second data corresponds to.

21. A machine-readable storage medium comprising a computer program, which, when executed, causes a device to perform a data processing method, and the method comprising:
   reading at least one encoded data printed on the printed matter through the optical identification device;
   obtaining at least one first data corresponding to an operation and one second data corresponding to one of the content data from the read encoded data; and
   performing the operation that the first data corresponds to on the one of the content data that the second data corresponds to.

\* \* \* \* \*